United States Patent
Osawa et al.

(10) Patent No.: US 8,462,240 B2
(45) Date of Patent: Jun. 11, 2013

(54) IMAGING SYSTEMS WITH COLUMN RANDOMIZING CIRCUITS

(75) Inventors: Shinji Osawa, Yokohama (JP); Isao Takayanagi, Tokyo (JP); Katsuyuki Kawamura, Tokyo (JP); Toshiaki Sato, Shizuoka (JP); Norio Yoshimura, Yokohama (JP); Shinichiro Matsuo, Kawasaki (JP); Hidenari Honda, Yokohama (JP)

(73) Assignee: Aptina Imaging Corporation, George Town (KY)

( * ) Notice: Subject to any disclaimer, the term of this patent is extended or adjusted under 35 U.S.C. 154(b) by 142 days.

(21) Appl. No.: 12/883,160

(22) Filed: Sep. 15, 2010

(65) Prior Publication Data

US 2012/0062772 A1    Mar. 15, 2012

(51) Int. Cl.
    *H04N 5/335*    (2011.01)
(52) U.S. Cl.
    USPC .................... 348/294; 250/208.1; 348/241
(58) Field of Classification Search
    USPC ........................................... 348/241
    See application file for complete search history.

(56) References Cited

U.S. PATENT DOCUMENTS

| | | | |
|---|---|---|---|
| 5,892,540 A | 4/1999 | Kozlowski et al. | |
| 5,926,214 A | 7/1999 | Denyer et al. | |
| 6,155,488 A | 12/2000 | Olmstead et al. | |
| 6,433,822 B1 | 8/2002 | Clark et al. | |
| 6,476,864 B1 | 11/2002 | Borg et al. | |
| 6,512,858 B2 | 1/2003 | Lyon et al. | |
| 6,570,617 B2 | 5/2003 | Fossum et al. | |
| 6,646,583 B1 | 11/2003 | Fossum et al. | |
| 6,787,752 B2 | 9/2004 | Tsai | |
| 6,911,641 B2* | 6/2005 | Tsai | 250/208.1 |
| 7,084,912 B2 | 8/2006 | Chieh | |
| 7,268,815 B1 | 9/2007 | Meynants | |
| 7,336,214 B2* | 2/2008 | Krymski | 341/172 |
| 7,554,066 B2* | 6/2009 | Yan | 250/208.1 |
| 7,609,303 B1 | 10/2009 | Lee et al. | |
| 7,719,580 B2 | 5/2010 | Havens et al. | |
| 7,812,876 B2* | 10/2010 | Hiyama et al. | 348/300 |
| 2002/0154347 A1* | 10/2002 | Funakoshi et al. | 358/513 |
| 2004/0114821 A1* | 6/2004 | Fukuzawa | 382/240 |
| 2006/0125940 A1* | 6/2006 | Tinkler et al. | 348/294 |
| 2008/0143855 A1 | 6/2008 | Hussey et al. | |
| 2008/0143860 A1* | 6/2008 | Sato | 348/301 |
| 2008/0259195 A1* | 10/2008 | Yoshida et al. | 348/308 |
| 2010/0066438 A1* | 3/2010 | Siprak et al. | 327/535 |
| 2012/0013780 A1* | 1/2012 | Mo et al. | 348/308 |

* cited by examiner

*Primary Examiner* — Chieh M Fan
*Assistant Examiner* — Wesley J Chiu
(74) *Attorney, Agent, or Firm* — Treyz Law Group; David C. Kellogg

(57) ABSTRACT

An imaging system may include an image sensor array and column randomizing multiplexers. The imaging system may include a data output circuit and image readout circuitry such as analog amplifiers, analog-to-digital converters, and memory circuits. The column randomizing multiplexers may include a first column randomizing multiplexer between the image sensor array and at least some of the image readout circuitry. The first column randomizing multiplexer may randomly connect columns of the image sensor array to the image readout circuitry. The connections made by the first column randomizing multiplexer may be randomized as each row of the image sensor array is read out. The column randomizing multiplexers may include a second column randomizing multiplexer between at least some of the image readout circuitry and the data output circuit. The second column randomizing multiplexer may reorder image data for the image readout circuitry.

17 Claims, 15 Drawing Sheets

IMAGING SYSTEMS WITH COLUMN RANDOMIZING CIRCUITS

BACKGROUND

This relates to imaging systems and, more particularly, to imaging systems with column randomizing circuits.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Typical image sensors include multiple identical sets of image readout circuits. Each image readout circuit is connected to a single column of pixels in the image sensor. Consequently, each pixel in a particular column is read out by a single image readout circuit. Differences between the image readout circuits result in column-wide image offsets (i.e., fixed pattern column noise). Image sensors implementing this type of arrangement therefore produces images with undesirable fixed pattern noise, which is more readily observed by a user than random noise.

It would therefore be desirable to provide improved imaging systems with column randomizing circuits.

DETAILED DESCRIPTION

Figure 1:
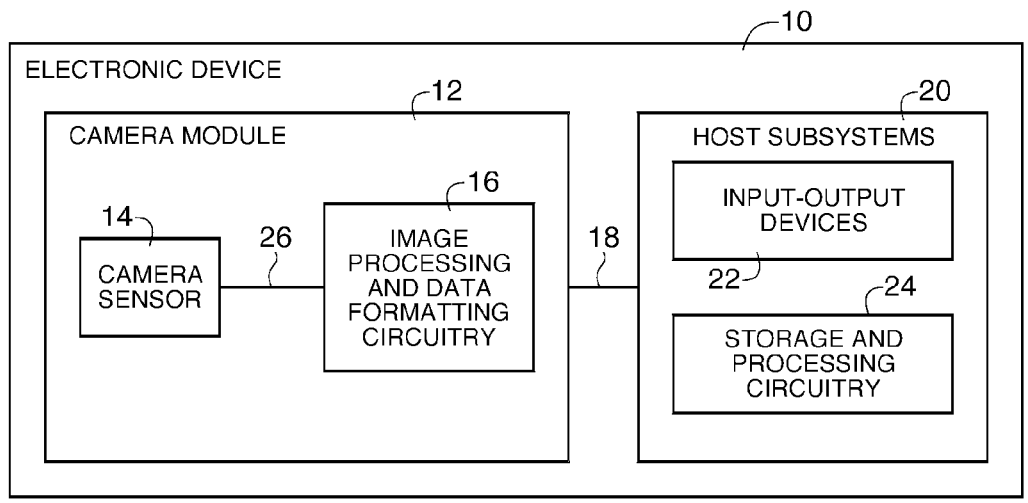
FIG. 1 is a diagram of an illustrative electronic device that may include a camera module with image processing and data formatting circuitry that includes column randomizing circuits that reduce fixed pattern column noise in images captured by the camera module in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include address circuitry, analog-to-digital (ADC) converter circuitry amplifier circuitry, switching circuitry (e.g., randomizing switching circuitry), data output circuitry, sample-and-hold circuitry, correlated double sampling (CDS) circuitry, memory (e.g., buffer circuitry), bias circuitry (e.g., source follower load circuits), etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
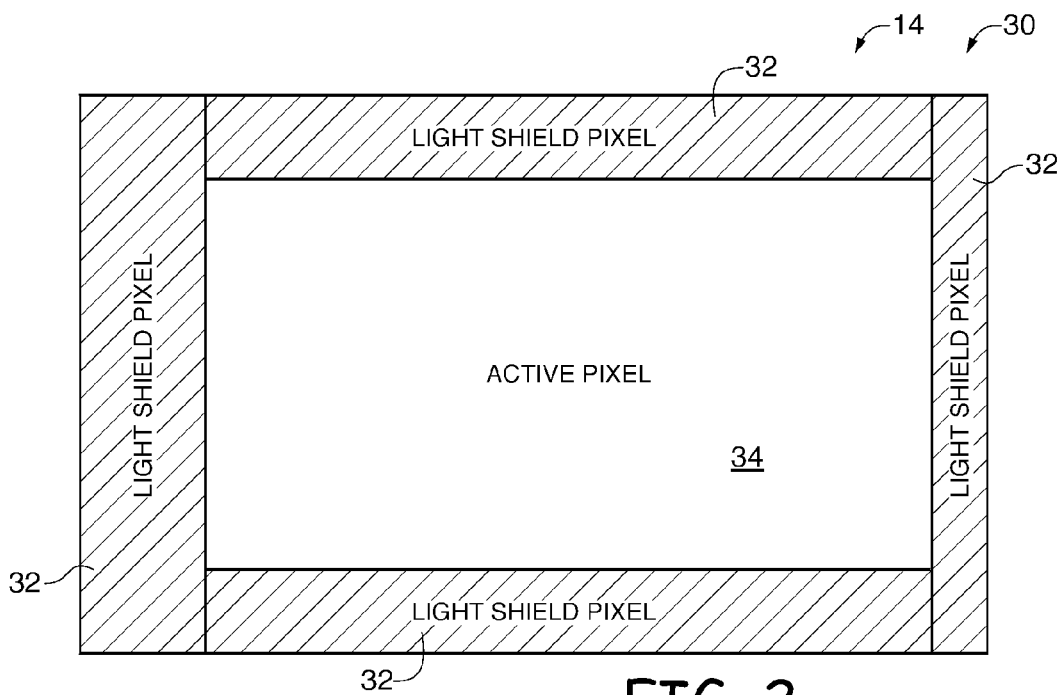
FIG. 2 is a top view of an illustrative image sensor of the type shown in FIG. 1 that may include active pixels exposed to incident light and dark pixels shielded from incident light in accordance with an embodiment of the present invention.

As shown in FIG. 2, camera sensor 14 may include an array 30 of pixels that includes active pixels 34 that are exposed to incident light and light shield pixels 32 that are shielded from incident light. As shown in the example of FIG. 2, image sensor array 30 may include light shield pixels 32 on each side of sensor 14 (e.g., on the top, right, bottom, and left sides of sensor 14). In general, sensor array 30 may include light shield pixels 32 on a single side, on two sides, on three sides, or on all four sides of sensor 14. Active pixels 34 and light shield pixels 32 may be identical, except for the addition of a light shield that prevents incident light from reaching light shield pixels 32. With this and other types of arrangements, image readout circuitry and processing circuitry 16 may use data from light shield pixels 32 in reducing noise in images captured by active pixels 34. For example, image readout circuitry in sensor 14 may use data from light shield pixels 32 to measure offsets and other factors introduced by analog-to-digital converter circuits, buffer circuits, amplifier circuits, and other circuitry in camera module 12 and may then remove the offsets and other factors from image data captured by active pixels 34.

Figure 3:
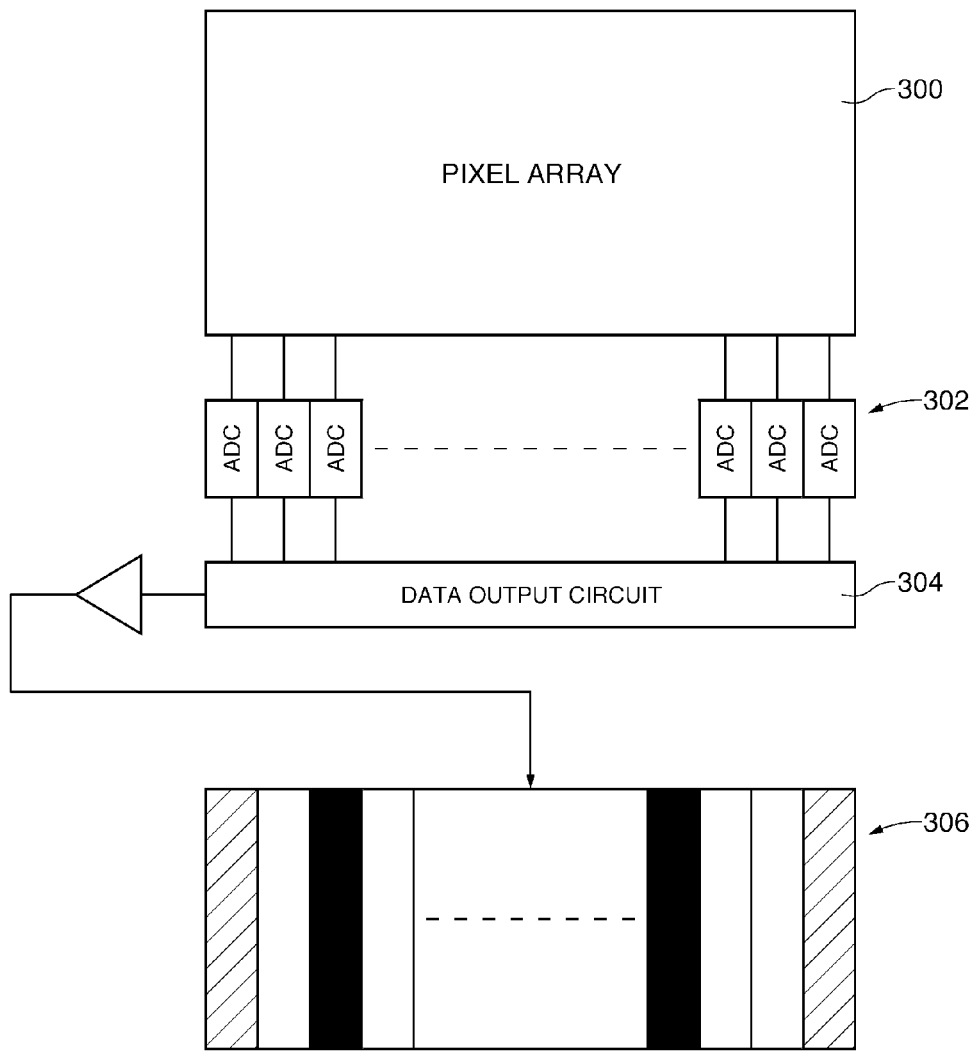
FIG. 3 is a schematic diagram of a conventional image sensor and image processing circuitry that produces images with fixed pattern column noise.

A conventional image sensor array 300 and image readout circuits 302 and 304 are shown in FIG. 3. As shown in FIG. 3, the conventional image sensor array 300 includes a plurality of rows of pixels. Images are captured by pixel array 300 and read out using analog-to-digital converters (ADCs) 302 and data output circuitry 304. In particular, each of the pixels in pixel array 300 accumulates charge in response to incident light. ADCs 302 then read out the accumulated charges and convert the accumulated charges into digital signals which are output by data output circuit 304.

Typically, accumulated charges (e.g., image data) are read out from array 300 one row of pixels at a time. With this type of arrangement, all of the pixels in a given columns of pixels in array 300 are read out by a single one of the ADCs 302. Variation between the various analog-to-digital converter circuits 302 creates undesirable fixed pattern noise, as illustrated by output image 306.

Figure 4:
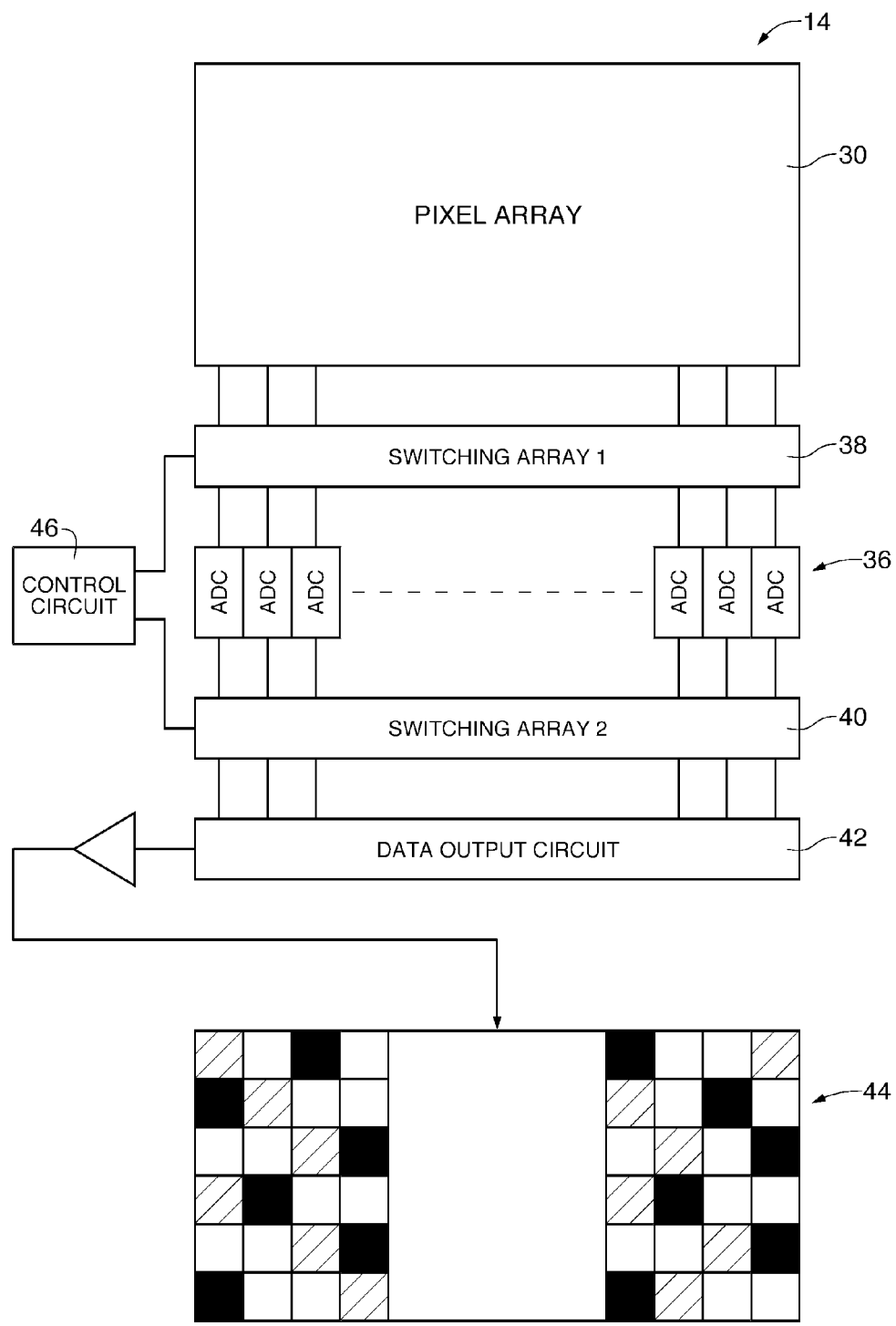
FIG. 4 is a schematic diagram of an illustrative image sensor and image processing and data formatting circuitry that may include column randomizing circuits in the form of a pair of switching arrays that are coupled between the image sensor and a data output circuit in accordance with an embodiment of the present invention.

One potential way to overcome the fixed pattern column noise inherent in images captures by conventional image sensor array 300 is shown in FIG. 4. As shown in FIG. 4, image sensor 14 may include switching arrays 38 and 40, analog-to-digital converters (ADCs) 36, pixel array 30, data output circuit 42, and control circuit 46. Control circuit 46 may control switching arrays 38 and 40.

With one suitable arrangement, control circuitry 46 may provide control signals to switching array 38 that direct array 38 to randomly shuffle which ADC 36 is connected to which column of pixels in array 30 as each row of pixels in array 30 is read out. For example, when a row of pixels is read out, circuitry 46 may direct array 38 to connect the first column of array 38 (e.g., the leftmost column of array 38) to the second ADC 36 (e.g., the ADC next to the leftmost ADC) and to connect the second column of array 38 (e.g., the column next to the leftmost column) to the first ADC 36 (e.g., the leftmost ADC). Then, when a subsequent row of pixels is read out, circuitry 46 may direct array 38 to connect the first column of array 38 to the first ADC 36 and to connect the second column of array 38 to the second ADC 36. The particular selection made by circuitry 46 about which column of array 30 is connected to which particular ADC may be made using a preset order or, if desired, may be randomized (e.g., circuitry 46 may use a random number generator to determine which ADC to connect to which particular column).

Control circuit 46 may provide control signals to switching array 40 to synchronize switching array 40 to switching array 38. Control circuit 46 may provide control signals to switching array 38 that randomize the image data from array 30 and may provide control signals to switching array 40 that reorder the image data (e.g., so that the image data outputted to data output circuit 42 is not randomized). As an example, when switching array 38 connects the first column of array 30 to the second ADC 36 (e.g., when reading out a particular row of array 30), switching array 40 may connect the second ADC 36 to a first data buffer in data output circuit 42 (e.g., a leftmost data buffer in circuit 42).

With the arrangement of FIG. 4, fixed pattern noise resulting from variations in ADCs 36 is reduced (e.g., the noise or variations from the different ADCs 36 is shuffled randomly about and randomized). Because random noise is less visible to users that fixed pattern noise, images captured by image sensor 14 such as image 44 may be more visually appealing that images captured by conventional image sensors.

Figure 5:
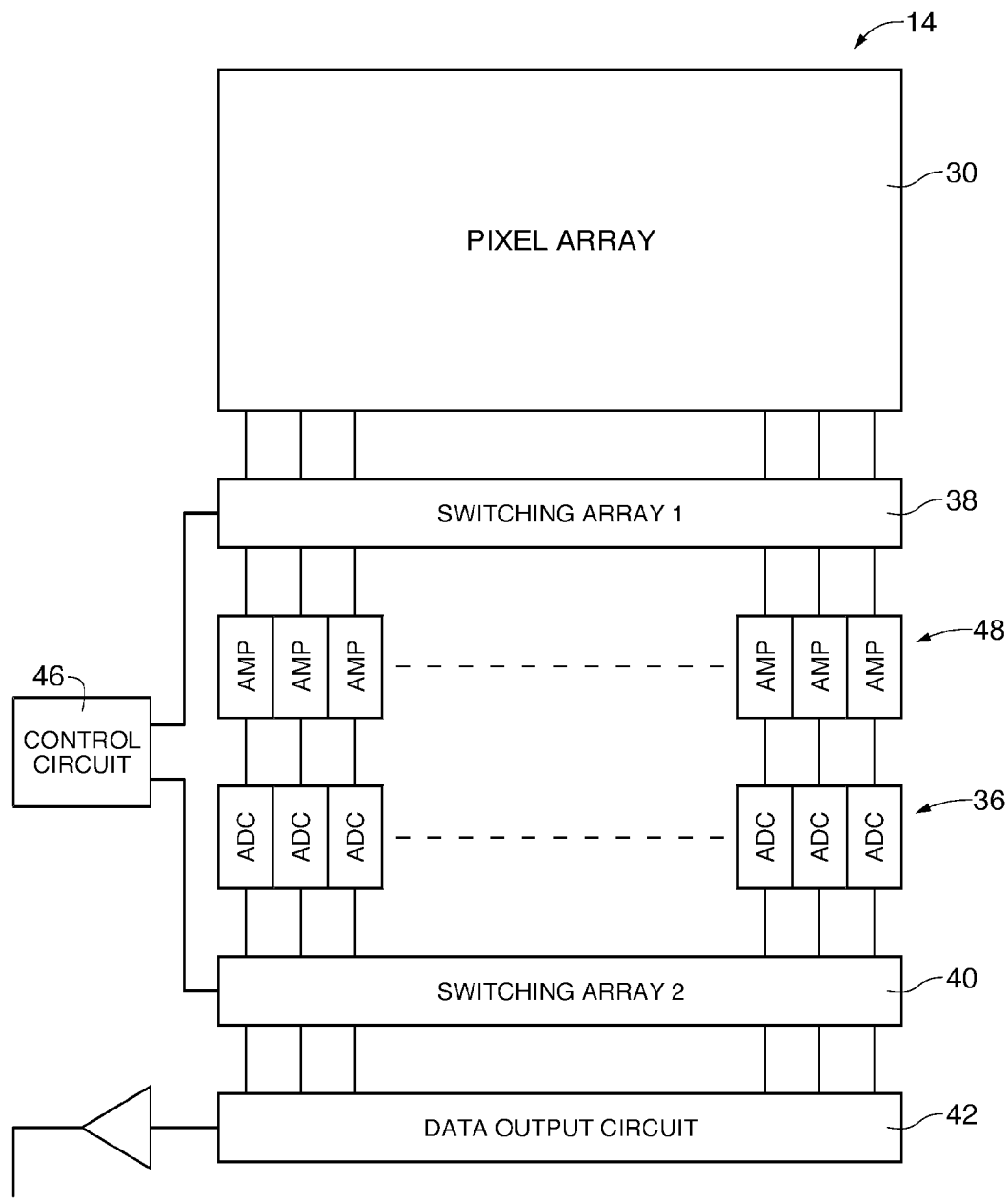
FIG. 5 is a schematic diagram of an illustrative image sensor and image processing and data formatting circuitry showing that the image processing and data formatting circuitry may include one or more amplifiers between the switching arrays of FIG. 4 in accordance with an embodiment of the present invention.
Figure 6:
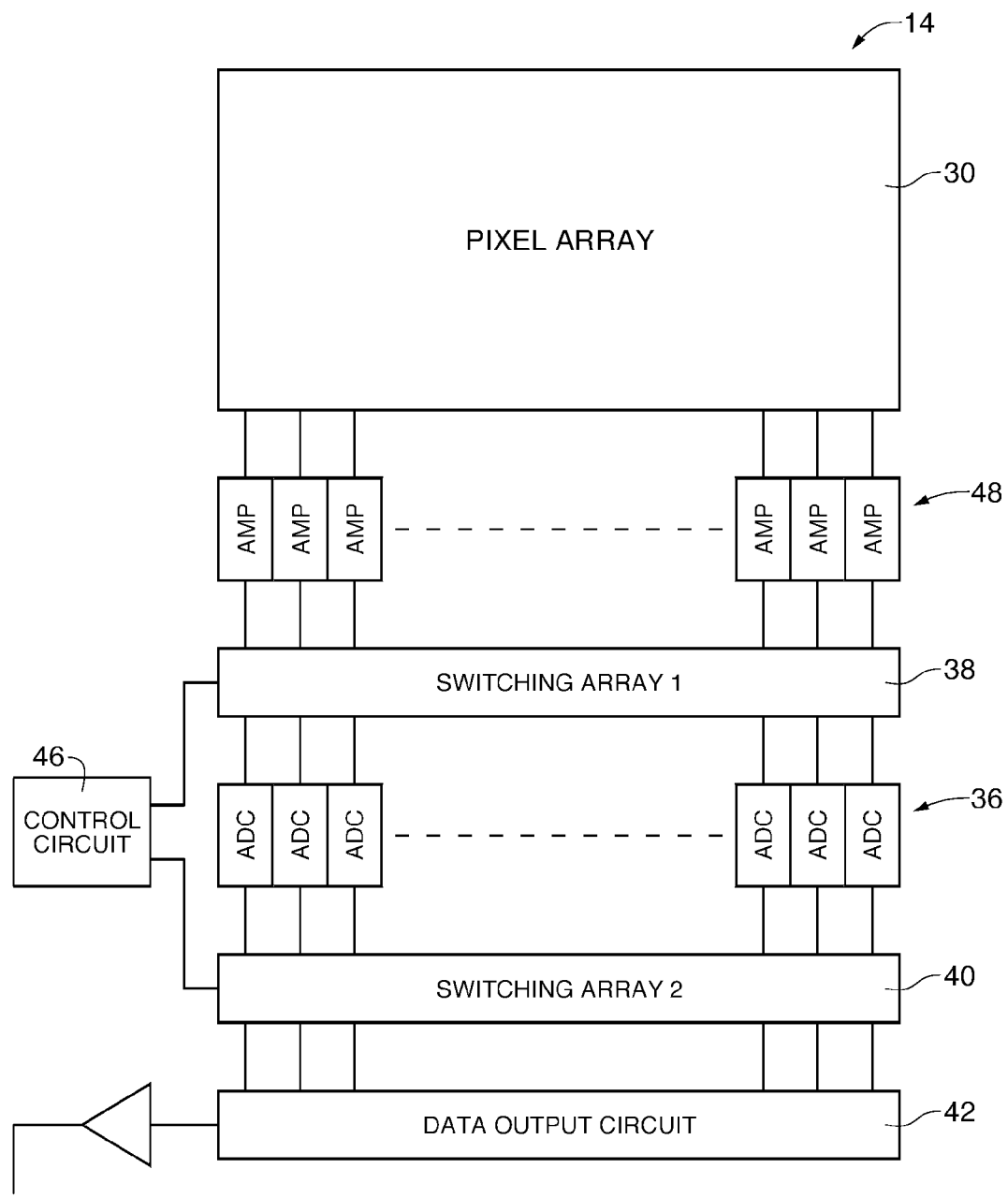
FIG. 6 is a schematic diagram of an illustrative image sensor and image processing and data formatting circuitry showing that the image processing and data formatting circuitry may include one or more amplifiers between the image sensor and the switching arrays of FIG. 4 in accordance with an embodiment of the present invention.

As shown in the example of FIGS. 5 and 6, image sensor 14 may include amplifier circuits 48. As shown in the example of FIG. 5, amplifier circuits 48 may be located between switching array 38 and ADCs 36. As shown in the example of FIG. 6, amplifier circuits 48 may be located between switching array 38 and pixel array 30. Each amplifier circuit 48 may amplify an analog image signal (and an analog reset signal, when image sensor 14 implements arrangements such as a correlated double sampling arrangement) for an analog-to-digital converter 36.

Figure 7:
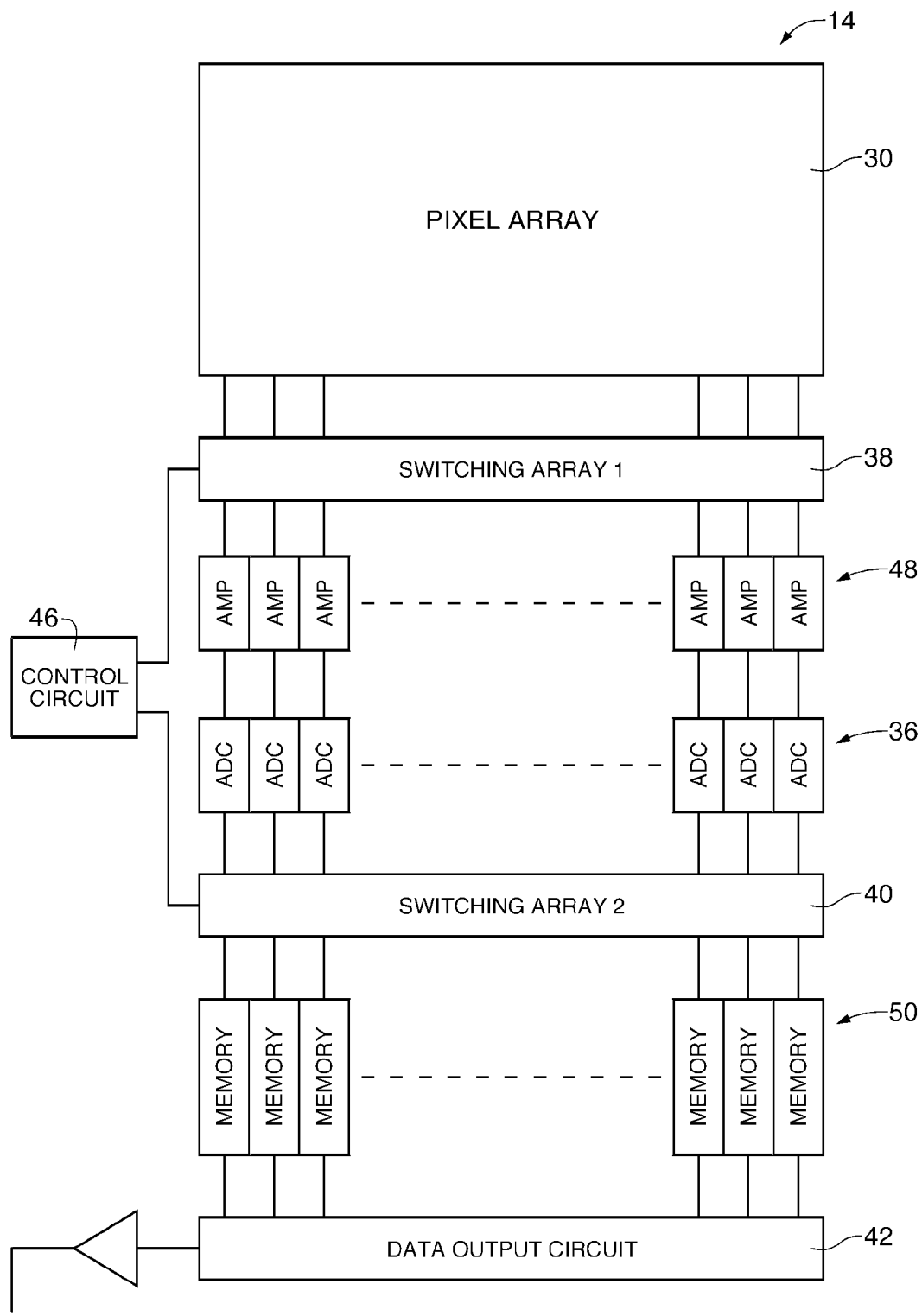
FIG. 7 is a schematic diagram an illustrative image sensor and image processing and data formatting circuitry showing that the image processing and data formatting circuitry may include one or more memory circuits between the data output circuit of FIG. 4 and the switching arrays of FIG. 4 in accordance with an embodiment of the present invention.
Figure 8:
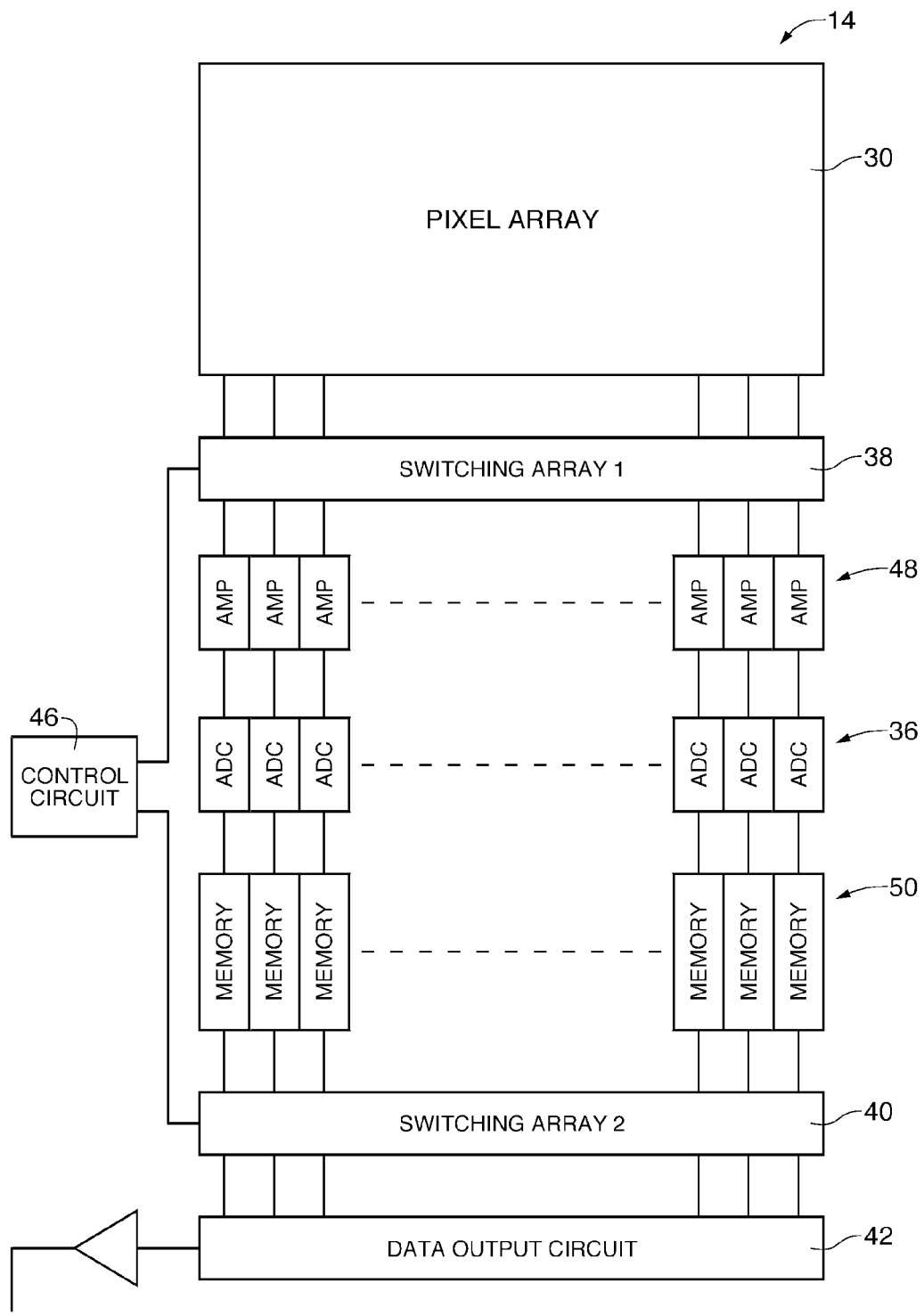
FIG. 8 is a schematic diagram of an illustrative image sensor and image processing and data formatting circuitry showing that the image processing and data formatting circuitry may include one or more memory circuits between the switching arrays of FIG. 4 in accordance with an embodiment of the present invention.

As shown in the example of FIGS. 7 and 8, image sensor 14 may include memory circuits 50. As shown in the example of FIG. 7, memory circuits 50 may be located between switching array 40 and data output circuit 42 (e.g., one or more output buffers). As shown in the example of FIG. 8, memory circuits 50 may be located between switching array 40 and ADCs 36. Each memory circuit 50 may store one or more digital values. The digital values may correspond to captured images (e.g., the digital values may represent a voltage of a pixel after accumulating charge in response to incident light).

Conventional image sensor arrays such as array 300 of FIG. 3 include source follower bias transistors that provide bias signals to pixels in array 300. Each source follower bias transistor provides a bias signal for a particular column of pixels in array 300. Differences in the bias signals (e.g., bias voltages and/or bias current) provided by the source follower bias transistors results in undesirable fixed pattern noise, as illustrated by output image 306 of FIG. 3.

Figure 9A:
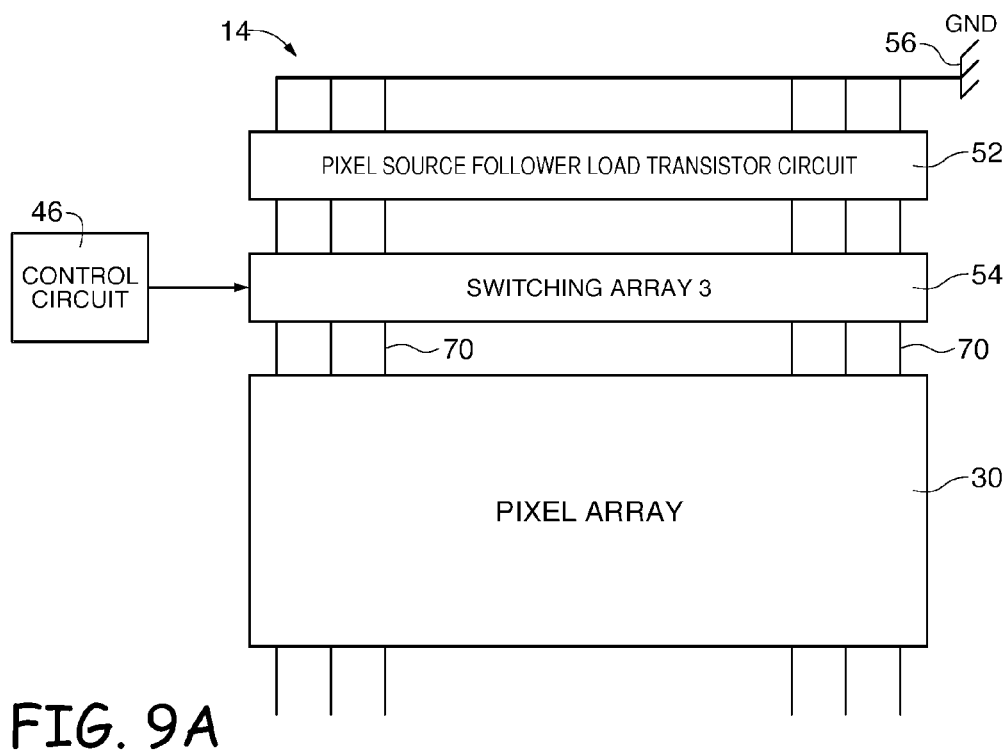
FIG. 9A is a schematic diagram of an illustrative image sensor and image processing and data formatting circuitry that may include column randomizing circuits in the form of a switching array that is coupled between the image sensor and pixel source follower load transistor circuits in accordance with an embodiment of the present invention.
Figure 9B:
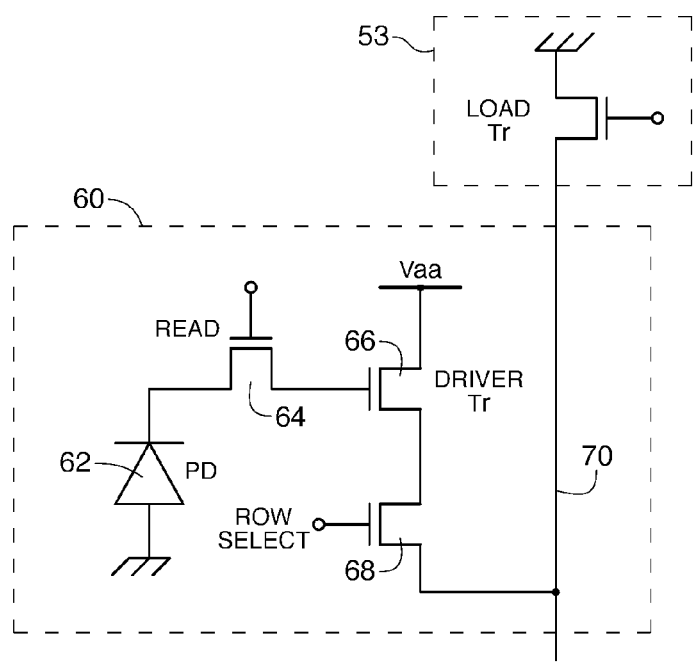
FIG. 9B is a schematic diagram of illustrative circuitry in each pixel of the image sensor of FIG. 9A and in the pixel source follower load transistor circuits of FIG. 9A in accordance with an embodiment of the present invention.

The fixed pattern noise resulting from differences in bias signals provided by source follower bias transistors can be mitigated using circuitry of the type shown in FIGS. 9A and 9B, as examples.

As shown in FIG. 9A, camera sensor 14 may include pixel source follower load transistor circuitry 52 and switching array 54. As shown in FIG. 9B, pixel source follower load transistor circuitry 52 may include a load circuit 53 for every column of pixels in array 30 (as an example). Each load circuit 53 may include a load transistor coupled between a column readout line 70 (e.g., a line connected to each of the pixels in a column of array 30) and a terminal that carries a voltage (e.g., a positive power supply terminal, a ground power supply terminal, a terminal that carries a bias voltage, etc.).

Each pixel 60 of array 30 may include a photosensitive element 62 (e.g., photodiode PD) that accumulates charge in response to incident light. When it is desired to read out pixel 60, transfer transistor 64 may be activated by transfer signals and row select transistor 68 may be activated by row select signals. When transfer transistor 64 is activated, the accumulated charged in photosensitive element 62 is provided to the gate of source follower transistor 66 (e.g., a driver in pixel 30). When row select transistor 68 is activated, source follower transistor 66 drives signals onto column readout line 70. The signals on column readout line 70 are read by image readout circuitry such as amplifier circuitry 48 and ADCs 36.

Switching array 54 may randomly swap which load circuit 53 in circuitry 52 is connected to which column of pixels in array 30. Control circuit 46 may provide control signals (e.g., randomized control signals) that control which load circuit 53 in circuitry 52 is connected to which column of pixels in array 30. As one example, during an image readout operation, switching array 54 may randomly connect each load circuit 53 in circuitry 52 to one of the columns of pixels in array 30. Switching array 54 may randomly swap the load circuits 53 (e.g., randomly connect each load circuit 53 in circuitry 52 to one of the columns of pixels in array 30) as part of reading image data out of each of the rows of array 30. With this type of arrangement, the load circuit 53 in circuitry 52 connected to a given column of pixels in array 30 can change as each row of pixels is read out, thereby randomizing the noise created by variations in the different circuits 53 and creating a more visually appealing image such as image 44 of FIG. 4.

Figure 10A:
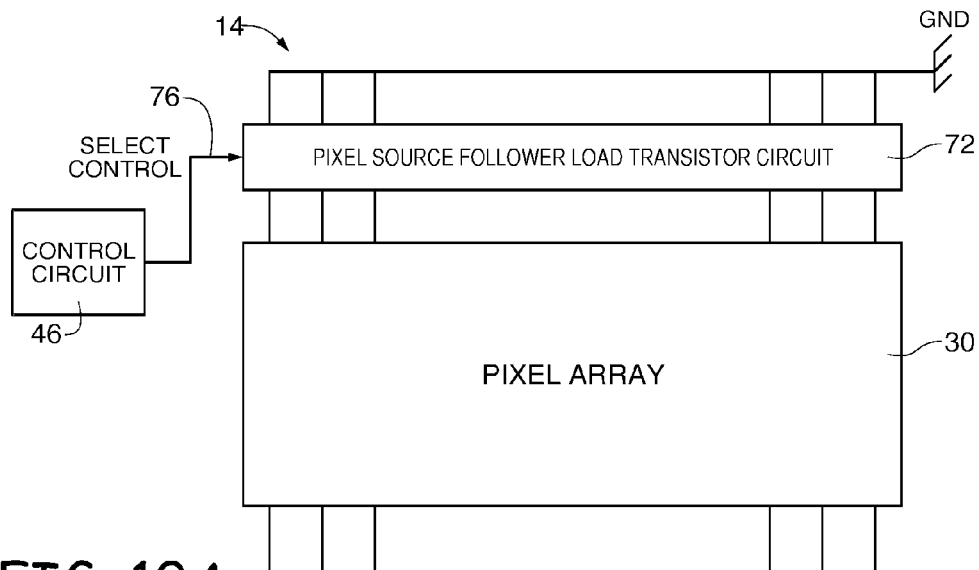
FIG. 10A is a schematic diagram of an illustrative image sensor and image processing and data formatting circuitry that may include randomized pixel source follower load transistor circuits in accordance with an embodiment of the present invention.
Figure 10B:
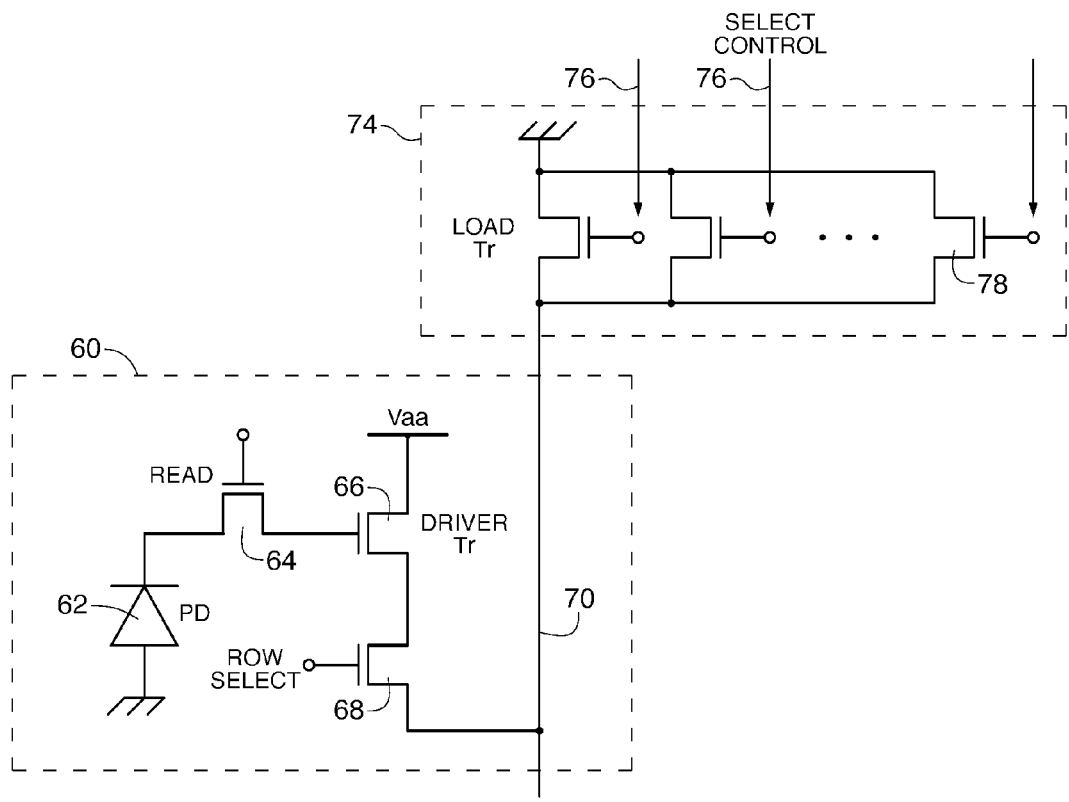
FIG. 10B is a schematic diagram of illustrative circuitry in each pixel of the image sensor of FIG. 10A and in the randomized pixel source follower load transistor circuits of FIG. 10A in accordance with an embodiment of the present invention.

An alternative to the arrangements of FIGS. 9A and 9B is shown in FIGS. 10A and 10B. As shown in FIG. 10A, switching array 54 may be omitted and a pixel source follower load transistor circuit 72 with load circuits 74 having multiple bias transistors may be provided. Circuit 72 may vary which bias transistor in each load circuit 74 is active using control signals such as select control 76.

A detailed schematic view of an individual load circuit 74 is shown in FIG. 10B. As shown in FIG. 10B, each load circuit 74 may include two or more load transistors 78 coupled between column readout line 70 and a terminal that carries a voltage (e.g., a positive power supply terminal, a ground power supply terminal, a terminal that carries a bias voltage, etc.). In order to avoid the fixed pattern noise of conventional imagers, circuitry 72 may use control signals such as select control signals 76 to swap which load transistor 78 is active at any given time (e.g., during the readout of any given row of pixels in array 30). For example, while reading out a first row of pixels, a control circuit such as circuit 46 may generate random control signals that randomly activate one of the load transistors 78 and, while reading out a second row of pixels, control circuit 46 may generate new random controls signals that randomly activate one of the load transistors 78.

With arrangements of the type shown in FIGS. 10A and 10B, multiple load transistors 78 are randomly activated for each of the columns of array 30, thereby randomizing the noise created by variations individual load transistors 78 and creating a more visually appealing image such as image 44 of FIG. 4 (e.g., an image with reduced fixed pattern noise). If desired, each load circuit 74 may be tied together such that the same load transistor 78 in each of the circuits 74 is activate in response to control signals 76 (e.g., when the first load transistor 78 of a first circuit 74 is randomly activated, the first load transistor 78 of each of the other circuits 74 may also be activated).

Figure 11:
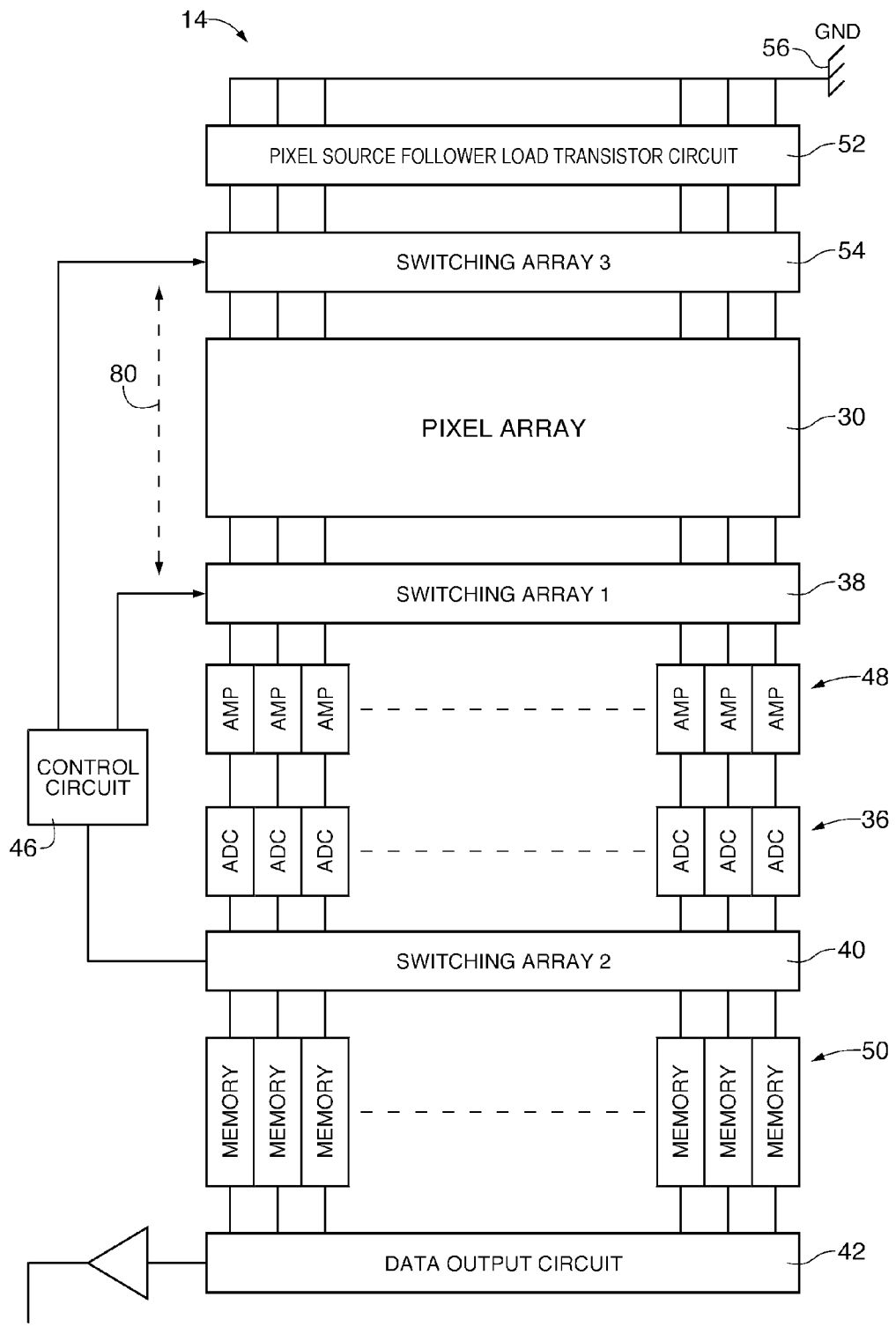
FIG. 11 is a schematic diagram of an illustrative image sensor and image processing and data formatting circuitry that may include column randomizing circuits in the form of a pair of switching arrays that are coupled between the image sensor and a data output circuit and a switching array that is coupled between the image sensor and pixel source follower load transistor circuits in accordance with an embodiment of the present invention.

As shown in FIG. 11, camera sensor 14 may include switching arrays such as switching array 54 of FIG. 9A and switching arrays 38 and 40 of FIGS. 4-8. Control circuit 46 may provide control signals (e.g., randomized control signals) for switching arrays 38, 40, and 54. Control circuit 46 may provide control signals (e.g., randomized control signals) to switching array 38 that randomize the connections between the columns of pixel array 30 and the column-level circuitry such as amplifiers 48, ADCs 36, and memory 50. Control circuit 46 may provide control signals to switching array 40 that are based on the randomized control signals provided to switching array 38. The controls signals that control circuit 46 provides to switching array 40 may direct switching array 40 to reorder the image data (e.g., to ensure that the column-level outputs of switching array 40 are ordered in the same manner as the column-level inputs of switching array 38. (Alternatively, control circuit 46 may provide randomized control signals to switching array 40 and control signals to switching array 38 that are based on the randomized control signals provided to switching array 40.)

As shown by dotted line 80, control circuit 46 may generate control signals for switching array 54 that may, if desired, be synchronized with control signals generated for switching array 38. Alternatively, control circuit 46 may generate control signals for switching array 54 and control signals for switching array 38 independently (e.g., randomly, such that the control signals for arrays 38 and 54 are not purposefully synchronized).

Figure 12:
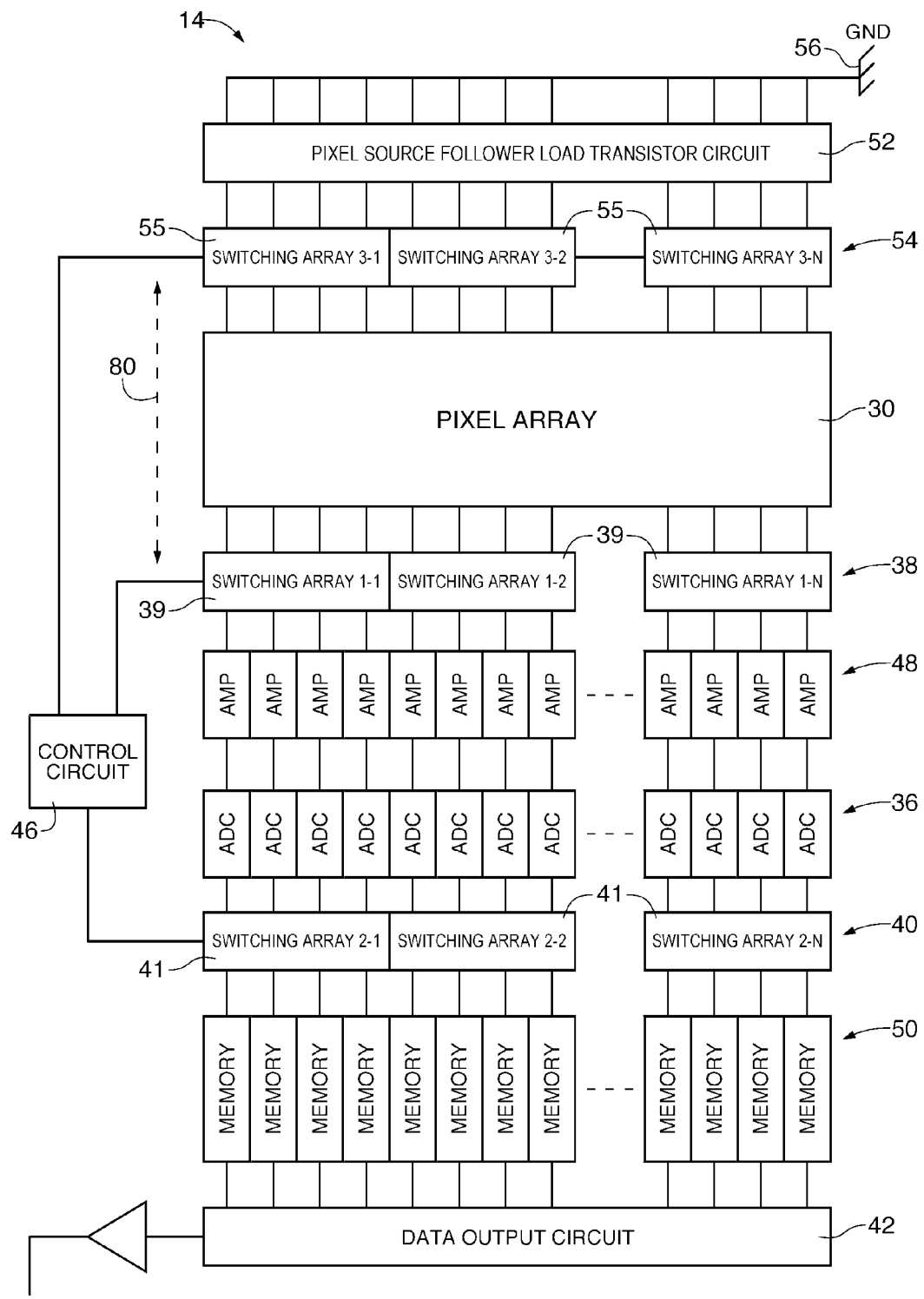
FIG. 12 is a schematic diagram of an illustrative image sensor and image processing and data formatting circuitry that may include column randomizing circuits in the form of one or more switching arrays, each of which is connected to a subset of the columns of the image sensor in accordance with an embodiment of the present invention.

If desired, switching arrays such as switching arrays 38, 40, and 54 may be divided into multiple smaller switching arrays (e.g., arrays having fewer column-level inputs and outputs than the number of columns in array 30). An arrangement of this type is shown in FIG. 12. In the example of FIG. 12, switching array 38 is formed from multiple sub-arrays 39, switching array 40 is formed from multiple sub-arrays 41, and switching array 54 is formed from multiple sub-arrays 55. In the FIG. 12 example, sub-arrays 39, 41, and 55 have four column-level inputs and four column-level outputs (e.g., sub-arrays 39, 41, and 55 have a width of four columns). This is merely illustrative and, in general, sub-arrays may have any suitable width.

With one suitable arrangement, some or all of the sub-arrays of a switching array may be controlled in the same way. For example, if control circuit 46 directs switching sub-array 1-1 to connect the first column of array 30 to the fourth column amplifier 46, control circuit 46 may also direct sub-array 1-2 to connect the fifth column of array 30 to the eighth column amplifier 46, direct sub-array 1-3 to connect the ninth column of array 30 to the twelfth column amplifier 46, etc. Similarly, if control circuit 46 directs switching sub-array 1-1 to connect the first column of array 30 to the fourth column amplifier 46 and controls each sub-array 39 in the same way, control circuit 46 may direct sub-array 2-1 to connect the fourth ADC 36 to the first memory circuit 50, direct sub-array 2-2 to connect the eighth ADC 36 to the fourth memory circuit 50, etc.

With another suitable arrangement, some or all of the sub-arrays of a switching array may be controlled independently. For example, control circuit 46 may randomly generate control signals for sub-array 1-1, randomly generate control signals for sub-array 1-2 (where the control signals for 1-2 are randomly derived rather than being based solely on the control signals for sub-array 1-1), etc.

Figure 13:
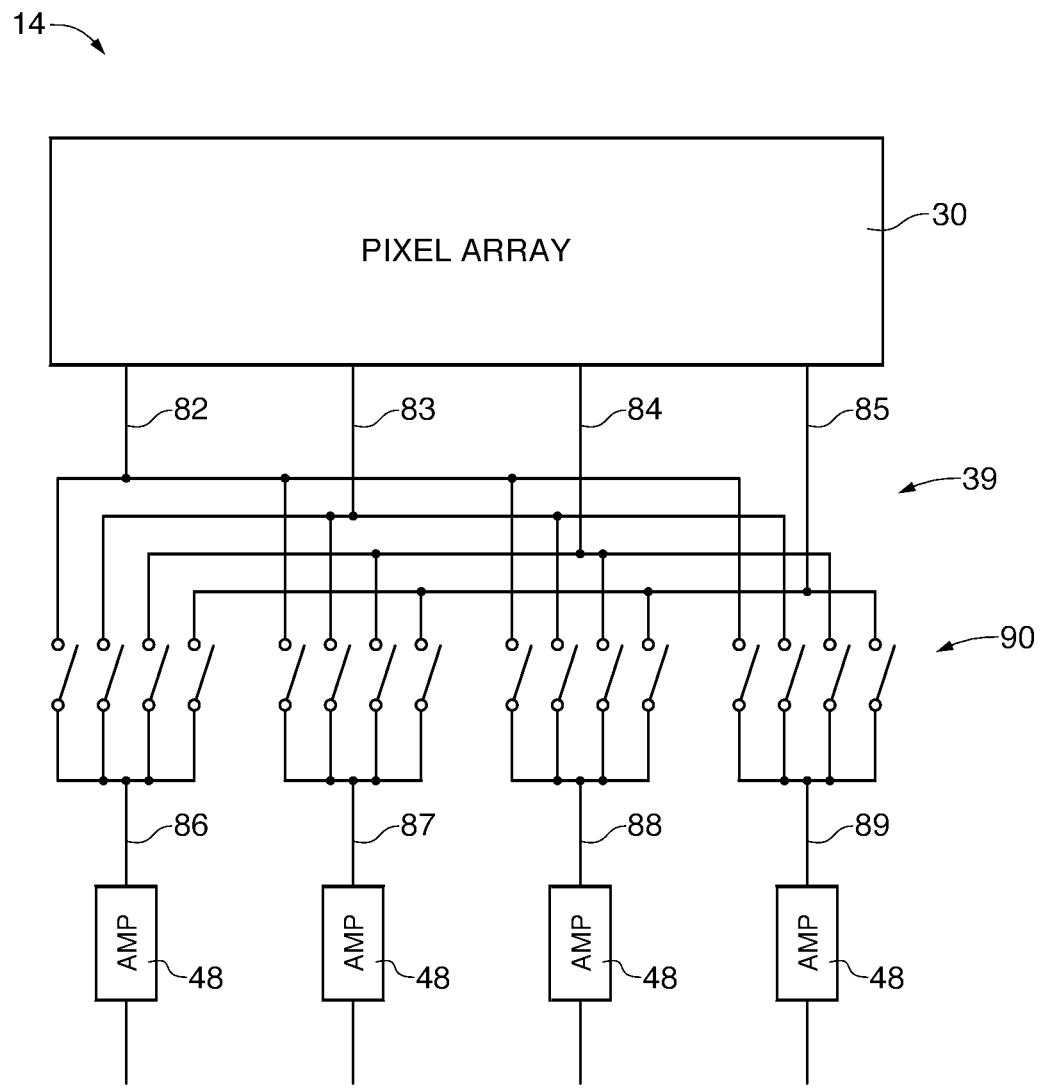
FIG. 13 is a schematic diagram of an illustrative image sensor and switching circuits having four switches in each column of the switching circuits in accordance with an embodiment of the present invention.

An example of a switching sub-array such as circuit 39 is shown in FIG. 13. While FIG. 13 illustrates an example of switching array circuit 39, switching arrays such as arrays 54, 55, 38, 40, and 41 may also be formed using the arrangement of FIG. 13. As shown in FIG. 13, switching sub-array 39 may include four switches 90 for each column-level input (e.g., for each column-level output). Each of the switches 90 may be opened or closed in a random manner in response to control signals from control circuitry such as control circuit 46. In general, only one of the switches connected to a single column input is closed at a time and only one of the switches connected to a single column output is closed at a time. With this type of arrangement, switching sub-array 39 forms a random set of connections between input lines 82, 83, 84, and 85 and output lines 86, 87, 88, and 89.

If desired, camera sensor 14 may include a pixel array 30 that utilizes a Bayer pattern for capturing color images (e.g., array 30 may be overlaid with a color filter array arranged in the Bayer pattern such that array 30 includes green, red, and blue pixels arranged in the Bayer pattern). With the Bayer pattern, array 30 includes a repeating two-by-two block of pixels such as block 92 that includes two green pixels, one red pixel, and one blue pixel. With this type of arrangement, it may be desirable to use arrangements with multiple sub-arrays such as sub-arrays 39, 41, and 55 that have a width of four columns. This type of arrangement is shown in FIGS. 14 and 15.

Figure 14:
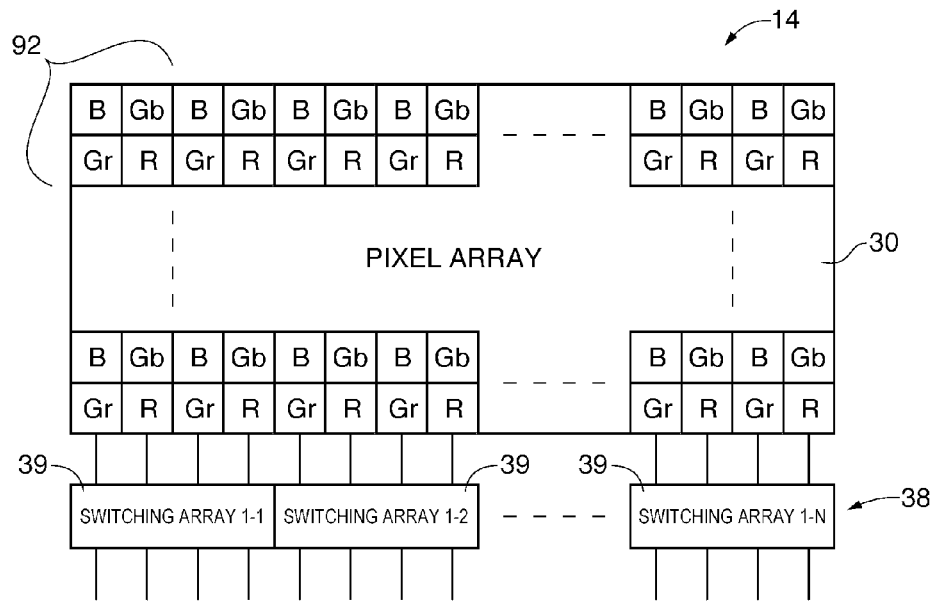
FIG. 14 is a schematic diagram of an illustrative image sensor having color pixels arranged in a Bayer pattern and switching arrays, each of which is connected to a subset of the columns of pixels in the image sensor in accordance with an embodiment of the present invention.

As shown in FIG. 14, each switching sub-array 39 may be connected to a group of adjacent columns of array 30.

Figure 15:
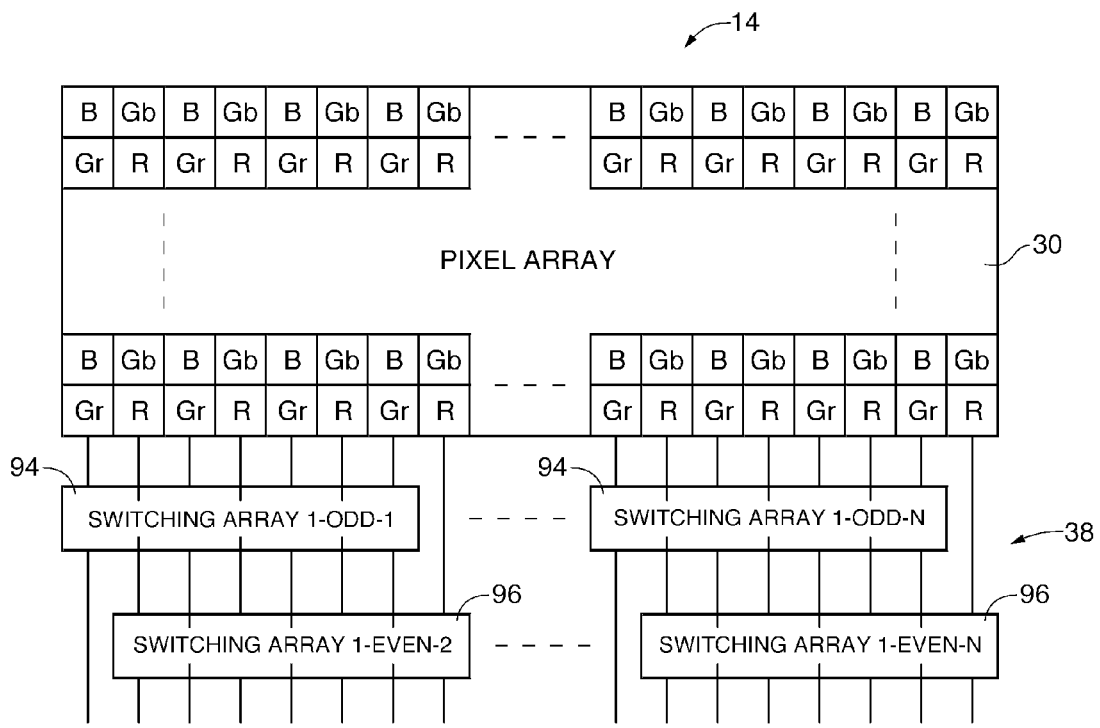
FIG. 15 is a schematic diagram of an illustrative image sensor having color pixels arranged in a Bayer pattern and switching arrays, each of which is connected to a subset of the columns of pixels in the image sensor and each of which is connected to similarly colored pixels in accordance with an embodiment of the present invention.

Alternatively, each switching sub-array 39 may be connected only to similarly colored pixels and pairs of switching sub-arrays 39 may be interwoven in their connections to the columns of array 30, as shown in FIG. 15. As shown in the FIG. 15 example, each switching sub-array 94 may be connected to odd columns of array 30 (e.g., the first, third fifth, etc. columns of array 30) and each switching sub-array 96 may be connected to even columns of array 30 (e.g., the second, fourth, sixth, etc. columns of array 30). With this type of arrangement, when reading out a row that begins with blue pixels, each switching sub-array 94 is only connected to blue pixels in that row and, when reading out a row that begins with green pixels, each switching sub-array 94 is only connected to green pixels in that row. Similarly, when reading out a row that begins with blue pixels, each switching sub-array 96 is only connected to green pixels in that row and, when reading out a row that begins with green pixels, each switching sub-array 96 is only connected to red pixels in that row.

The arrangement of FIG. 15 may be preferable when implementing a horizontal binning operation in which image charges from horizontally adjacent and similarly-colored pixels are summed during an image readout operation. In particular, the arrangement of FIG. 15 may facilitate the binning (i.e., summing) of pixel outputs by circuitry such as amplifiers 46 and ADCs 36.

Figure 16A:
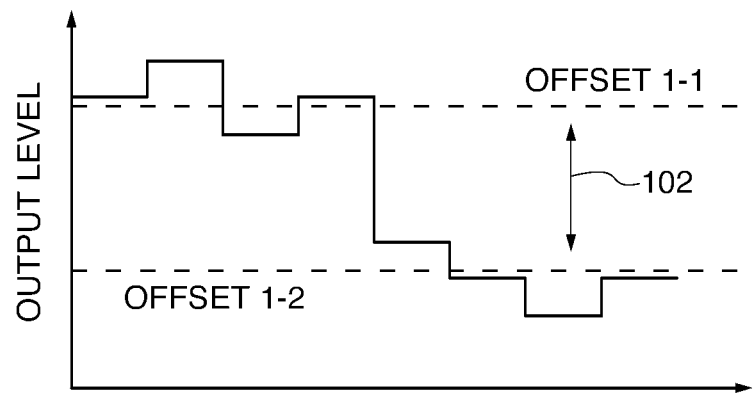
FIG. 16A is a graph of illustrative output levels for various switching arrays in the arrangement of FIG. 14 showing how each of the switching arrays may contribute a different offset to the output levels in accordance with an embodiment of the present invention.
Figure 16B:
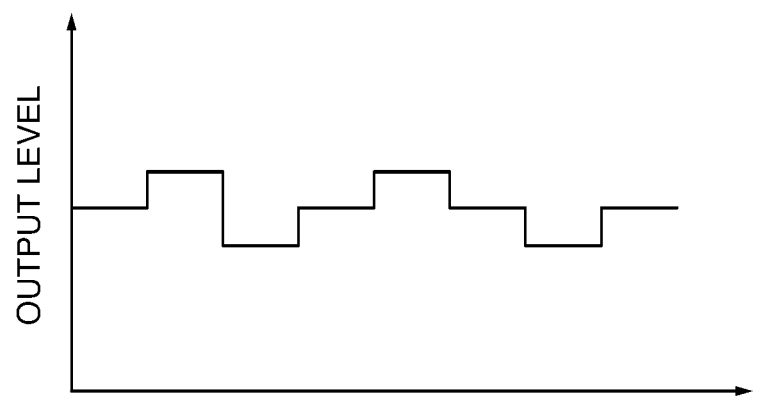
FIG. 16B is a graph of illustrative output levels for various switching arrays in the arrangement of FIG. 14 after the offset differences of the various switching arrays have been subtracted in accordance with an embodiment of the present invention.

A graph of illustrative output levels output levels for switching sub-arrays 39 of FIG. 14 is shown in FIG. 16A. The output levels of image data that is passed through each switching sub-array 39 may be offset from the output levels output by pixel array 40. As shown in FIG. 16A for example, switching sub-array 1-1 (e.g., a first sub-array 39) may have an offset such as offset 1-1 and switching sub-array 1-2 (e.g., a second sub-array 39) may have an offset such as offset 1-2, which is different from offset 1-1 as illustrated by offset difference 102. Because the offset introduced by each switching sub-array 39 is independent of the image data, the offsets can be determined using image data from light shield regions 32 and subtracted from image data captured from active pixel region 34. After compensating for the offsets introduced by each sub-array 39, the resulting output levels may take a form such as that shown in FIG. 16B. This type of arrangement may help to reduce fixed pattern noise (e.g., FPN having a width equal to the width of each sub-array 39).

Figure 17A:
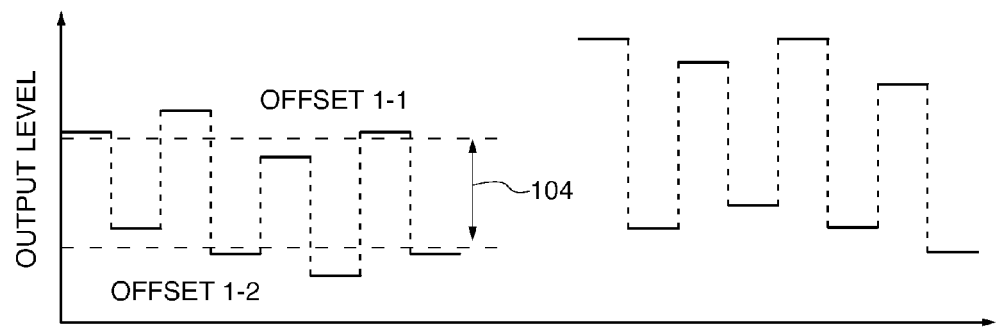
FIG. 17A is a graph of illustrative output levels for various switching arrays in the arrangement of FIG. 15 showing how each of the switching arrays may contribute a different offset to the output levels in accordance with an embodiment of the present invention.
Figure 17B:
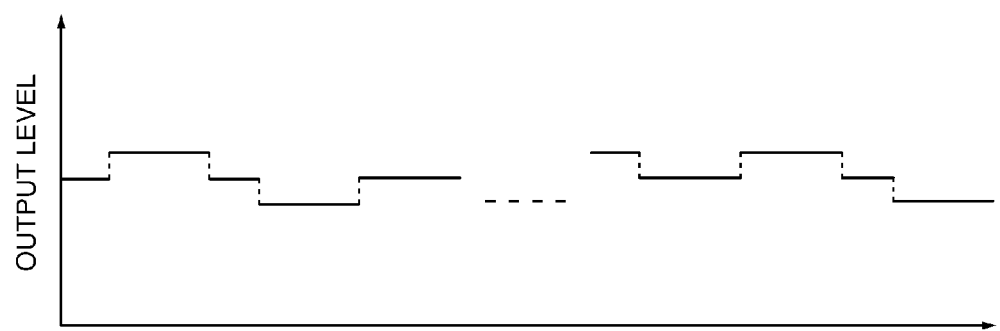
FIG. 17B is a graph of illustrative output levels for various switching arrays in the arrangement of FIG. 15 after the offset differences of the various switching arrays have been subtracted in accordance with an embodiment of the present invention.

A graph of illustrative output levels output levels for switching sub-arrays 94 and 96 of FIG. 15 is shown in FIG. 17A. Except for the fact that the switching sub-arrays 1-1 and 1-2 are interwoven in the FIG. 15 arrangement as switching sub-arrays 1-Odd-1 and 1-Even-2, the noise reduction processes of FIGS. 16A and 16B may be similar. The output levels of image data that is passed through each of the switching sub-arrays 94 and 96 may be offset from the output levels output by pixel array 40. As shown in FIG. 17A for example, switching sub-array 1-Odd-1 (e.g., a first switching sub-array 94) may have an offset such as offset 1-1 and switching sub-array 1-Even-2 (e.g., a first switching sub-array 96) may have an offset such as offset 1-2, which is different from offset 1-1 as illustrated by offset difference 104. Because the offset introduced by each switching sub-array 94 and 96 is independent of the image data, the offsets can be determined using image data from light shield regions 32 and subtracted from image data captured from active pixel region 34. After compensating for the offsets introduced by each sub-array 94 and 96, the resulting output levels may take a form such as that shown in FIG. 17B. This type of arrangement may help to reduce fixed pattern noise (e.g., FPN having a width equal to the width of each sub-array 39).

The noise reduction techniques of FIGS. 16A, 16B, 17A, and 17B may also be applied to other switching arrays described herein such as switching arrays 38, 40, and 54 and switching sub-arrays 39, 41, 55, 94, and 96.

With one suitable arrangement, a column randomizing multiplexer such as switching array 38, 40, and/or 54 may enable and disable column randomizing. Alternatively or in addition, control circuit 46 may enable and disable column randomizing. Column randomizing functions may be enabled and disabled by a register setting in camera module 12 (e.g., in camera sensor 14 or in image processing and data formatting circuitry 46). If desired, column randomizing functions may be enabled and disabled by control circuitry (e.g., control circuit 46, image processing and data formatting circuitry 16, etc.) in response to a gain setting for camera module 12. For example, when the gain of camera module 12 is set to a relatively high level (e.g., when low-light-flux conditions are detected by circuitry in device 10), column randomizing functions may be enabled. Conversely, when the gain of camera module 12 is set to a relatively low level (e.g., when higher-light-flux conditions are detected by circuitry in device 10), column randomizing functions may be disabled. Disabling column randomizing functions may include setting each switching array (and, if present, each switching sub-array) to stop altering the connections between its inputs and its outputs as each row of pixels in array 30 is read out. Disabled switching arrays may simply keep the connections between their inputs and outputs static at the last random connection arrangement generated by control circuit 46 or, if desired, may default to connecting their first inputs to the first outputs, their second inputs to their second outputs, etc.

Various embodiments have been described illustrating imaging systems with column randomizing circuits.

An electronic device may have a camera module with an image sensor array that captures images. The camera module may include column randomizing circuits. The column randomizing circuits may be a part of image readout circuitry and, if desired, may be a part of bias circuitry that supplies bias voltages to the image sensor array. The camera module may include a data output circuit and image readout circuitry such as analog amplifiers, analog-to-digital converters, and memory circuits. The column randomizing circuits may include a first column randomizing multiplexer connected between the image sensor array and at least some of the image readout circuitry. The first column randomizing multiplexer may randomly connect columns of the image sensor array to the image readout circuitry. The connections made by the first column randomizing multiplexer as each row of the image sensor array is read out. The column randomizing circuits may include a second column randomizing multiplexer between at least some of the image readout circuitry and the data output circuit. The second column randomizing multiplexer may reorder image data for the image readout circuitry.

The foregoing is merely illustrative of the principles of this invention which can be practiced in other embodiments.

What is claimed is:

1. An image sensor comprising:
an array of image sensing pixels arranged in rows and columns;
a plurality of image readout circuits;
data output circuitry;
a first multiplexer having inputs and outputs, wherein each of the inputs of the first multiplexer is coupled to a respective one of the columns of the array and wherein each of the outputs of the first multiplexer is coupled to a respective one of the image readout circuits;
a plurality of bias circuits, each of which provides a bias voltage; and
a second multiplexer that connects each of the bias circuits to a randomly-selected and different one of the columns of image sensing pixels in the array.

2. The image sensor defined in claim 1 further comprising:
a third multiplexer having inputs and outputs, wherein each of the inputs of the third multiplexer is coupled to a respective one of the image readout circuits and wherein the outputs of the third multiplexer are coupled to the data output circuitry.

3. The image sensor defined in claim 2 wherein each of the image readout circuits comprises an analog-to-digital converter.

4. The image sensor defined in claim 3 wherein each of the image readout circuits further comprises an analog amplifier.

5. The image sensor defined in claim 4 further comprising a plurality of memory circuits, wherein each memory circuit has an input connected to a respective one of the outputs of the first multiplexer and has an output connected to the data output circuitry.

6. The image sensor defined in claim 3 further comprising control circuitry that directs at least one of the first and third multiplexers to connect each of its inputs to a randomly-selected and different one of its outputs.

7. The image sensor defined in claim 3 further comprising control circuitry that directs the first multiplexer to randomize connections between the columns of the array and the image readout circuits by connecting each of the inputs of the first multiplexer to a randomly-selected and different one of the outputs of the first multiplexer, wherein the control circuitry directs the third multiplexer to de-randomize the connections as image data is transferred from the image readout circuits to the data output circuitry.

8. The image sensor defined in claim 7 wherein the control circuitry directs the third multiplexer to connect the inputs of the third multiplexer to the outputs of the third multiplexer to compensate for the randomized connections made by the first multiplexer between the columns of the array and the image readout circuits.

9. The image sensor defined in claim 3 wherein the first and third multiplexers are each formed from a plurality of smaller multiplexers having fewer inputs and outputs than the first and third multiplexers.

10. The image sensor defined in claim 9 wherein the image sensing pixels comprise red pixels, blue pixels, and green pixels arranged in a Bayer pattern.

11. An image sensor comprising:
an array of image sensing pixels arranged in rows and columns;
a plurality of bias circuits, wherein each of the bias circuits comprises a plurality of transistors and wherein, when one of the transistors is turned on, that transistor provides a bias voltage; and
circuitry that turns on a random one of the transistors in each of the bias circuits.

12. An image sensor comprising:
an array of image sensing pixels arranged in rows and columns;
a plurality of analog-to-digital converters;

a first multiplexer having inputs and outputs, wherein each of the inputs of the first multiplexer is coupled to a respective one of the columns of the array and wherein each of the outputs of the first multiplexer is coupled to a respective one of the analog-to-digital converters;

an output buffer;

a second multiplexer having inputs and outputs, wherein each of the inputs of the second multiplexer is coupled to a respective one of the analog-to-digital converters and wherein the outputs of the second multiplexer are coupled to the output buffer; and a plurality of bias circuits, wherein each of the bias circuits comprises a plurality of transistors and wherein, when one of the transistors is turned on, that transistor provides a bias voltage; and circuitry that turns on a random one of the transistors in each of the bias circuits.

13. The image sensor defined in claim 12 further comprising a plurality of analog amplifiers each of which is connected between a respective one of the outputs of the first multiplexer and a respective one of the analog-to-digital converters.

14. A method of reducing fixed pattern column noise in images captured by an imager, wherein the imager comprises a pixel array including image sensing pixels arranged in rows and columns, a switching array, a data output circuit, and image readout circuits coupled between the pixel array and the data output circuit, the method comprising:

enabling column randomizing functions that utilize the switching array;

while the column randomizing functions are enabled, reading image data associated with a first image from the image sensing pixels in the pixel array;

disabling the column randomizing functions; and while the column randomizing functions are disabled, reading image data associated with a second image from the image sensing pixels in the pixel array, wherein the imager further comprises circuitry that detects lower-light-flux conditions and that detects higher-light-flux conditions, wherein enabling the column randomizing functions comprises enabling the column randomizing functions in response to the circuitry detecting the lower-light-flux-conditions, and wherein disabling the column randomizing functions comprises disabling the column randomizing functions in response to the circuitry detecting the higher-light-flux-conditions.

15. The method defined in claim 14 wherein reading the image data associated with the second image from the image sensing pixels in the pixel array while the column randomizing functions are disabled comprises:

using the switching array to connect, in turn as each of the rows of the image sensing pixels is read out, each of the image sensing pixels in a given one of the columns of the image sensing pixels to a given one of the image readout circuits.

16. The method defined in claim 15 wherein reading the image data associated with the first image from the image sensing pixels while the column randomizing functions are enabled comprises:

reading image data associated with the first image from a first one of the rows of the image sensing pixels by using the switching array to connect each of the image sensing pixels in the first one of the rows to a randomly-selected and different one of the image readout circuits; and reading image data associated with the first image from a second one of the rows of image sensing pixels by using the switching array to connect each of the image sensing pixels in the second one of the rows to a randomly-selected and different one of the image readout circuits, wherein, while reading image data associated with the first image, the switching array connects the image sensing pixels in the first one of the rows of the array to the image readout circuits in a different pattern than the switching array connects the image sensing pixels in the second one of the rows of the array to the image readout circuits.

17. The image sensor defined in claim 11 further comprising:

a plurality of image readout circuits, wherein each of the image readout circuits comprises an analog-to-digital converter;

data output circuitry;

a first multiplexer having inputs and outputs, wherein each of the inputs of the first multiplexer is coupled to a respective one of the image readout circuits and wherein the outputs of the first multiplexer are coupled to the data output circuitry; and a second multiplexer having inputs and outputs, wherein each of the inputs of the second multiplexer is coupled to a respective one of the columns of the array and wherein each of the outputs of the second multiplexer is coupled to a respective one of the image readout circuits.

* * * * *